(12) United States Patent
Gamble et al.

(10) Patent No.: US 8,495,256 B2
(45) Date of Patent: Jul. 23, 2013

(54) HARD DISK DRIVE AVAILABILITY FOLLOWING TRANSIENT VIBRATION

(75) Inventors: Eric T. Gamble, Raleigh, NC (US); Kenton C. Green, Cary, NC (US); Carl E. Jones, Tucson, AZ (US); Timothy J M Louie, Apex, NC (US); Robert D. Peavler, Cary, NC (US); David A. Verburg, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/006,470

(22) Filed: Jan. 14, 2011

(65) Prior Publication Data

US 2012/0182641 A1    Jul. 19, 2012

(51) Int. Cl.
   *G06F 3/00*    (2006.01)
   *G06F 5/00*    (2006.01)
   *G06F 13/12*    (2006.01)
   *G06F 13/38*    (2006.01)
   *G06F 13/00*    (2006.01)

(52) U.S. Cl.
   USPC .................. 710/15; 710/16; 710/60; 710/65; 710/68; 710/100

(58) Field of Classification Search
   USPC ............................ 710/15, 16, 60, 65, 68, 100
   See application file for complete search history.

(56) References Cited

U.S. PATENT DOCUMENTS

| | | | |
|---|---|---|---|
| 6,484,217 B1 * | 11/2002 | Fuente et al. ................... | 710/15 |
| 6,937,423 B1 * | 8/2005 | Ngo et al. ................... | 360/77.02 |
| 6,963,463 B2 * | 11/2005 | Sri-Jayantha et al. .......... | 360/75 |
| 7,161,758 B2 * | 1/2007 | Adapathya et al. ............. | 360/69 |
| 7,375,911 B1 * | 5/2008 | Li et al. ........................... | 360/75 |
| 7,567,402 B2 * | 7/2009 | Aihara ............................ | 360/75 |
| 2006/0122854 A1 * | 6/2006 | Campello et al. ................. | 705/1 |
| 2006/0200593 A1 * | 9/2006 | Kambayashi et al. .......... | 710/15 |

(Continued)

OTHER PUBLICATIONS

Patently Apple, "Apple Reveals Hard Drive Shock Event Detection & Intelligent Storage", Jan. 7, 2010, www.patentlyapple.com/patently-apple/2010/01/apple-reveals-hard-drive-shock-event-detection-intelligent-storage.html+patent+detect+vibration+sensor+Hard+drive+hdd&cd=6&hl=en&ct=clnk&gl=us&client=firefox-, 5 pages.

*Primary Examiner* — Idriss N Alrobaye
*Assistant Examiner* — Getente A Yimer
(74) *Attorney, Agent, or Firm* — Cynthia G. Seal; Jeffrey L. Streets (57) ABSTRACT

A method and computer program product for sending a data request from a host bus adapter logic processor to a hard disk drive, setting a standard time out period for receiving a reply from the hard disk drive, sensing vibration in the hard disk drive, sending a vibration alert signal from the hard disk drive to the host bus adapter logic processor in response to the sensed vibration exceeding a predetermined amount of vibration, and, in response to receiving the vibration alert signal from the hard disk drive, the host bus adapter logic processor establishing an extended time out period for receiving the reply. The rotational vibration sensor used by the hard disk drive for repositioning the read/write head may also be used to sense the vibration and form the basis for the vibration alert signal, such as a vibration error code. By extending the time out period during high vibration events, the hard disk drive can ride out the event without being tagged as having failed. Accordingly, the hard disk drive can then be available for use following the high vibration event.

16 Claims, 4 Drawing Sheets

U.S. PATENT DOCUMENTS

2008/0209103 A1* 8/2008 Haga .......................... 711/100
2009/0161243 A1* 6/2009 Sharma et al. ................ 360/31
2009/0168249 A1* 7/2009 McCaslin et al. .......... 360/245.3
2010/0321818 A1* 12/2010 Morris et al. ................... 360/69

* cited by examiner

HARD DISK DRIVE AVAILABILITY FOLLOWING TRANSIENT VIBRATION

BACKGROUND

1. Field of the Invention

The present invention relates to methods of dealing with excessive vibration in a hard disk drive.

2. Background of the Related Art

Computer systems use hard disk drives to provide large amounts of data storage. The performance of hard disk drives has increased to the point that consumers can buy a low cost hard disk drive (HDD) with 2 terabytes (TB) of data storage for less than one hundred dollars. As a result, some enterprises are implementing these low cost HDDs instead of the more robust and expensive enterprise HDDs previously used.

Unfortunately, these low cost HDDs are very sensitive to transient vibration events, such as an earthquake or a gas fire suppression release in a data center. This puts critical data at risk. Furthermore, the vibration and acoustic sensitivity of these HDDs is expected to increase along with the data storage capacity. For example, a 4 TB HDD is expected to exhibit twice the vibration and acoustic sensitivity as a 2 TB HDD of the same design.

When a hard disk drive experiences a high level of external vibration and cannot respond to a data request, a host bus adapter or controller will complete an error recovery process and wait for a reply until a time out value is reached. If the HDD has not replied by the end of the time out period, then the host bus adapter or controller identifies the HDD as "failed" and writes that information to a metadata log stored on the HDD unit. After that, this metadata will prevent a host bus adapter or controller from using the "failed" HDD. Rather, a user must buy a new HDD and load it with data recovered in some manner or obtained from a backup copy. This is a slow process with high risk of data loss.

A redundant array of inexpensive disks (RAID) is one way to protect data from being lost when a HDD fails. One advantage of a RAID array is that if one of the HDDs in the array fails, the data array can be reconstructed from the remaining HDDs in the array. Unfortunately, vibration from some environmental events, such as earthquakes, fire suppression system deployment, and vehicular traffic, can affect all of the HDDs in the array or even all of the HDDs in the data center. Depending upon the design of the array, simultaneous failure of multiple HDDs may prevent the array from being reconstructed from data on the remaining HDDs. Rather, the failed HDDs must be replaced and the data array must be rebuilt from scratch from a backup copy of the data on a new set of HDDs. This process may result in permanent data loss, temporary unavailability of data storage capacity, and significant capital and operational expense.

BRIEF SUMMARY

One embodiment of the present invention provides a method, comprising sending a data request from a host bus adapter logic processor to a hard disk drive, sensing vibration in the hard disk drive, sending a vibration alert signal from the hard disk drive to the host bus adapter logic processor in response to the sensed vibration exceeding a predetermined amount of vibration, and, in response to receiving the vibration alert signal from the hard disk drive, the host bus adapter logic processor establishing an extended time out period during which the host bus adapter logic processor waits to receive the data requested.

Another embodiment of the invention provides a computer program product including computer usable program code embodied on a computer usable storage medium. The computer program product comprises computer usable program code for sending a data request from a host bus adapter logic processor to a hard disk drive, sensing vibration in the hard disk drive, sending a vibration alert signal from the hard disk drive to the host bus adapter logic processor in response to the sensed vibration exceeding a predetermined amount of vibration, and, in response to receiving the vibration alert signal from the hard disk drive, the host bus adapter logic processor establishing an extended time out period during which the host bus adapter logic processor waits to receive the data requested.

DETAILED DESCRIPTION

One embodiment of the present invention provides a method, comprising sending a data request from a host bus adapter logic processor to a hard disk drive (HDD), setting a standard time out period for receiving a reply from the hard disk drive, sensing vibration in the hard disk drive, sending a vibration alert signal from the hard disk drive to the host bus adapter logic processor in response to the sensed vibration exceeding a predetermined amount of vibration, and, in response to receiving the vibration alert signal from the hard disk drive, the host bus adapter logic processor establishing an extended time out period for receiving the reply. Optionally, in addition to extending the time out period, other recovery steps may be performed in response to receiving the vibration alert signal.

The host bus adapter logic processor is a core or processor that is typically included in a host bus adapter or a controller. On smaller systems, the host bus adapter logic processor is part of a host bus adapter that may be in the form of a PCI adapter card in the host computer for communicating with the HDDs. On large enterprise systems, the host bus adapter logic processor is part of a controller that takes the place of the host bus adapter. A controller of this type is typically a separate unit that only controls the HDDs and has enhanced function over the simple host bus adapter. In both a host bus adapter and a controller, the host bus adapter logic processor will implement a time out period, during which time the processor may take various error correction actions.

The inventors have found that a transient high vibration event, such as an earthquake, gas fire suppression event, or nearby vehicle traffic, will often cause the performance of a HDD to go to zero for a period of time. During a high vibration event, the HDD is unable to provide requested data over a period of time that may exceed a standard time out period and the HDD may be tagged as having failed. However, it is often the case that the HDD is not permanently damaged by the high vibration event. Various embodiments of the invention give the hard disk drive additional time (i.e., an extended time out period) to ride out the high vibration event before determining whether the HDD has in fact failed. If the HDD has not actually failed, the HDD may still be used as soon as the high vibration event subsides. Accordingly, the system is able to avoid data loss, storage outage and the replacement costs associated with a failed HDD. Furthermore, the host bus adapter logic processor may continue to perform error recovery actions during the extended time out period.

The vibration in the HDD may be sensed using a rotational vibration (RV) sensor that is part of a conventional system for the control of a read/write head and which provides a signal used to reposition the read/write head of the HDD. The rotational vibration sensor typically provides a raw signal that is used in a feed forward servo loop that controls the tracking of the read/write head to counteract background levels of vibration. However, in accordance with the present invention, the HDD controller provides a vibration alert to the host bus adapter logic processor, but only after all the internal HDD processes are unable to keep the read/write head on track. The vibration alert signal is preferably a digital signal sent to the host bus adapter logic processor over a data bus, such as a Serial Advanced Technology Attachment (SATA) but or a Serial Attached SCSI (SAS) bus. The vibration alert signal may be either a qualitative indication of an error, a quantitative measure of the extent of the vibration, or both. For example, a qualitative indication may take the form of an error code that the host bus adapter logic processor will recognized as indicating the presence of excessive vibration. In an alternative embodiment, the HDD may include a dedicated vibration sensor that communicates a vibration signal with an internal HDD controller.

In response to sending out a data request to an HDD, the host bus adapter logic processor will initiate a standard time out period in which data should be received from the HDD in fulfillment of the data request. However, embodiments of the host bus adapter logic processor may establish an extended time out period in response to receiving a vibration alert signal from the HDD prior to expiration of the standard time out period. The length of the extended time out period may vary widely, but should be long enough allow any anticipated vibration events to pass. Furthermore, the extended time out period may be a predetermined fixed time period, or a variable time period that is determined based upon one or more conditions, such as the continued sensing of vibration over a setpoint level. For example, the time out period may be indefinitely extended (suspended) upon receiving the vibration alert signal and reset to a definite time out period only once the vibration has reduced below an acceptable level. Following a vibration alert signal, an acceptable level of vibration might be indicated by either a vibration clear signal or the receipt of a data reply. In systems having multiple HDDs in data communication with a given host bus adapter logic processor, it should be recognized that the standard or extended time out period should be established separately for each HDD.

The host bus adapter logic processor may write meta data indicating that the HDD has failed to a reserved area of the HDD that is not accessible to the operating system. Though this prevents a user from accessing the meta data, once the data is written to the HDD, any host bus adapter logic processor that tries to read or write to the HDD will become aware that this drive was failed. Accordingly, the HDD should only be tagged as having failed in response to an amount of time that the host bus adapter logic processor waits on a data reply either exceeding the standard time out period without receiving a vibration alert signal or exceeding the extended time out period after receiving a vibration alert signal. It should be recognized that any time out period will be cleared or satisfied if a reply to the data request is received before the time out period is exceeded.

The host bus adapter logic processor may be in data communication with a plurality of HDDs that each include a vibration sensor and are each capable of communicating a vibration alert signal to the host bus adapter logic processor. If vibration alert signals are received from a setpoint number of the HDDs, such as two or more of the HDDs, then the host bus adapter logic processor may interpret this situation as an indication of a broader (global) vibrational event, such as an earthquake, gas fire suppression event, or nearby vehicle traffic. Accordingly, the foregoing method may further comprise the host bus adapter logic processor reporting a (global) vibration event alert signal to a host device in response to receiving a vibration alert signal from two or more of the HDDs. The vibration event alert signal enables the host device to take evasive action to protect data on the plurality of HDDs. For example, evasive action that may be taken by the host device to protect data on the plurality of HDDs may include one or more action selected from ceasing data flow to the HDDs, performing a fire hose dump of cache memory, initiating a remote backup of the data on the HDDs, and issuing a user-detectable alert to a system operator.

The method may be optionally implemented in a system wherein the HDD is a component of a redundant array of independent disks (RAID) and the host bus adapter logic processor performs the additional duties of the RAID controller. Still further, a plurality of HDDs in the RAID array may each be capable of reporting a vibration alert signal to the host bus adapter logic processor and/or the RAID controller. In a RAID array that includes mirroring (complete redundancy of each disk drive), where only one of the mirrored disks is not responding to a data request, then the RAID controller may simply satisfy the data request using only the available disk. In a RAID array without mirroring, the fault tolerance of the array may affect how the host bus adapter logic processor or RAID controller responds to receiving one or more vibration alert signals. For example, a RAID 6 array requires a minimum of four disks and has block-level striping with double distributed parity, such that the array can be recovered from the failure of any two disks.

Another embodiment of the invention provides a computer program product including computer usable program code embodied on a computer usable storage medium. The computer program product comprises computer usable program code for sending a data request from a host bus adapter logic processor to a HDD, setting a standard time out period for receiving a reply from the HDD, sensing vibration in the HDD, sending a vibration alert signal from the HDD to the host bus adapter logic processor in response to the sensed vibration exceeding a predetermined amount of vibration, and, in response to receiving the vibration alert signal from the HDD, the host bus adapter logic processor establishing an extended time out period for receiving the reply.

The computer program product may include computer usable program code to be executed by an HDD controller and a host bus adapter logic processor, and may implement any of the aspects of the foregoing methods. Some aspects of the method may also be implemented in computer usable program code executed by a host device or a RAID controller.

Figure 1:
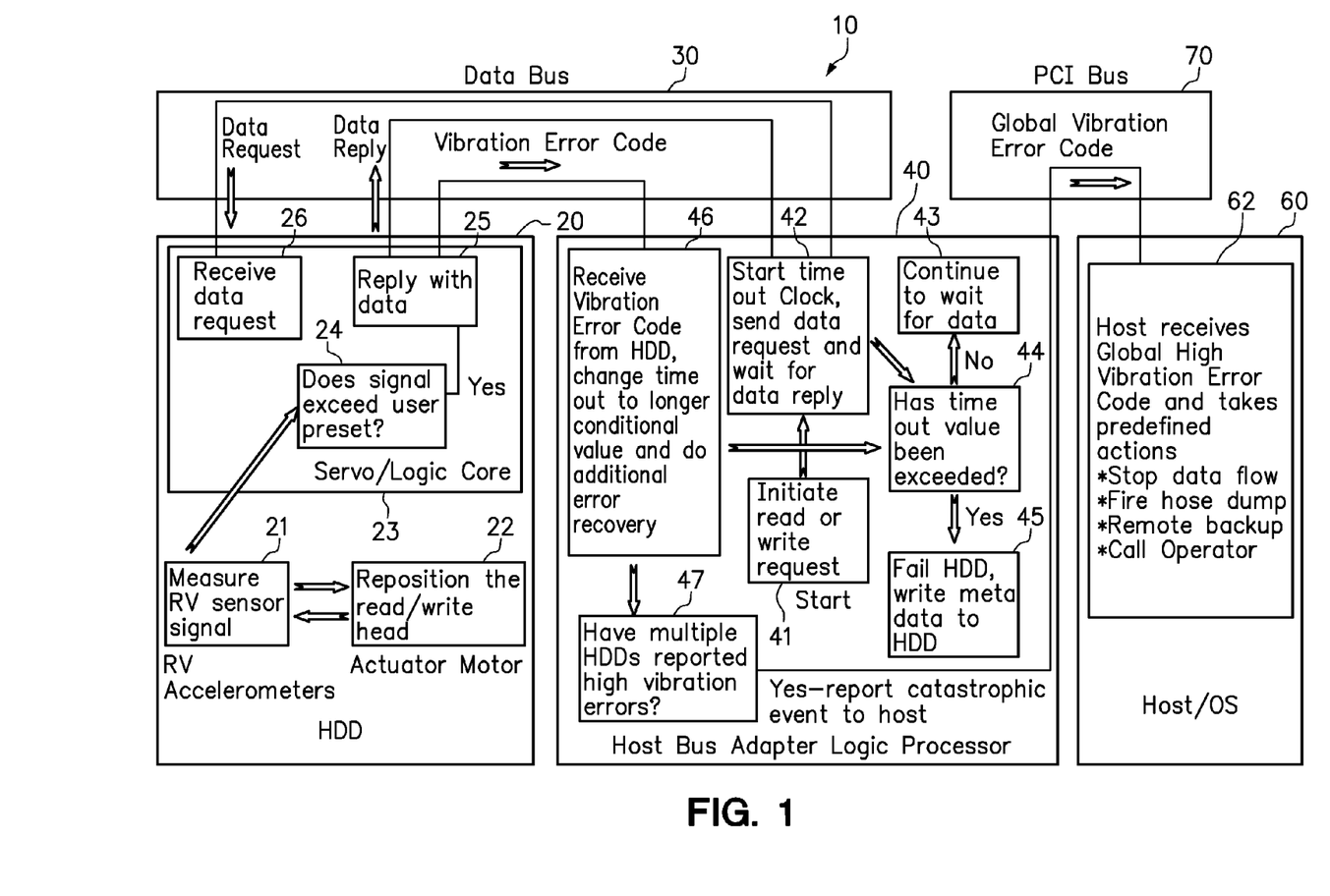
FIG. 1 is a diagram of a computer system including hard disk drive in communication with a host bus adapter logic processor over a data bus.

FIG. 1 is a diagram of a computer system 10 including a hard disk drive (HDD) 20 in communication with a host bus adapter logic processor 40 over a data bus 30, and a host device 60 in communication with the host bus adapter logic processor 40 over a PCI bus 70. The host device 60, using its operating system (OS), sends requests to read or write data to the HDD 20 through the host bus adapter logic processor 40.

The HDD 20 receives data requests over the data bus 30 at an input port/logic unit (step 26). The servo/logic core 23 attempts to fulfill the data request by directing the actuator motor to position a read/write head at the appropriate position on the disk. If the data request can be satisfied, then an output port/logic unit sends a reply with any requested data (step 25) over the data bus 30 to the host bus adapter logic processor 40. The HDD 20 includes, among other elements know in the art, a rotational vibration sensor that provides a rotational vibration signal (step 21) to an actuator motor that uses the signal to reposition the read/write head of the HDD (step 22) and keep the read/write head on track despite background levels of vibration.

In accordance with the present invention, to the servo/logic core 23 monitors the rotational vibration signal and determines whether the rotational vibration has exceeded a user predetermined amount of vibration (step 24). Preferably, the predetermined amount of vibration is an amount or level at which the hard disk drive cannot be expected to perform at all (i.e., vibration levels that cause its IO rate to fall to zero). If the vibration has not exceeded the predetermined amount, then it is not necessary for the servo/logic core to take further action. However, if the vibration does exceed the predetermined amount, then a high vibration error code is sent through an output port/logic unit to the data bus 30 for delivery to the host bus adapter logic processor 40.

The host bus adapter logic processor 40 initiates data read or write requests (step 41). The request is sent to the HDD 20 over the data bus 30, and a standard time out period is started (step 42). The host bus adapter logic processor 40 then waits for a reply from the HDD 20 (step 43), so long as the time out period has not been exceeded (step 44). If the time out period is exceeded, then the meta data is written to the HDD indicating that it has failed (step 45).

In accordance with the present invention, the host bus adapter logic processor 40 is also programmed to recognize a vibration error code or other vibration alert signal received from the HDD 20. In response to receiving a high vibration error code from a given HDD, the time out period for any outstanding data request will be extended (step 46). The HDD 20 will not be failed (step 45) unless it fails to respond to a data request beyond the extended time out period (step 44). Additional error recovery may also be done (per step 46) to ensure every effort has been made to retain the HDD in the array, thereby allowing the system to quickly recover from the high vibration event.

When catastrophic events occur in the data center, such as a fire, fire suppression system release, or earthquake, it is advantageous for the host system 60 to adapt to the sensed vibration levels and make intelligent decisions to minimize risk to the customer data and hardware. For this reason, if the host bus adapter logic processor 40 receives a high vibration error code from at least a preset number (i.e., two or more) of HDDs, then the host bus adapter logic processor 40 will send a global high vibration error code to the host device 60. From that error signal, the host device 60 can be programmed to take one or more risk mitigation steps, such as stopping the data flow to the storage system, performing a fire hose dump of cache memory, initiating a remote backup, or alerting the system operator (step 62).

Figure 2:
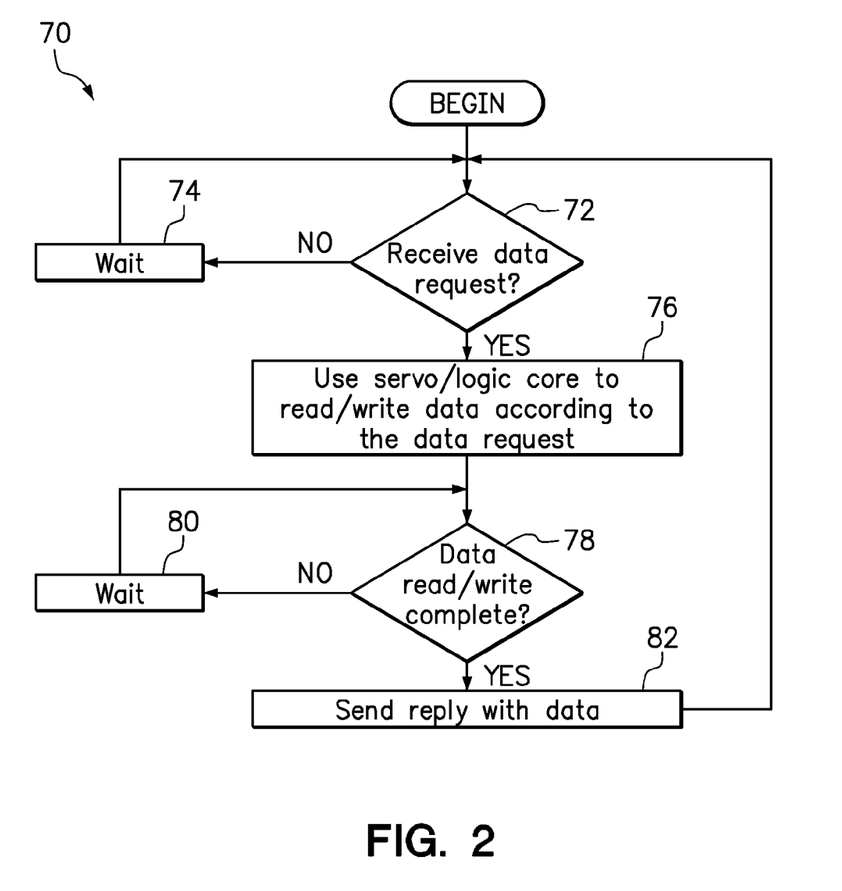
FIG. 2 is a flowchart of a method of a hard disk drive receiving and replying to a data request.
Figure 3:
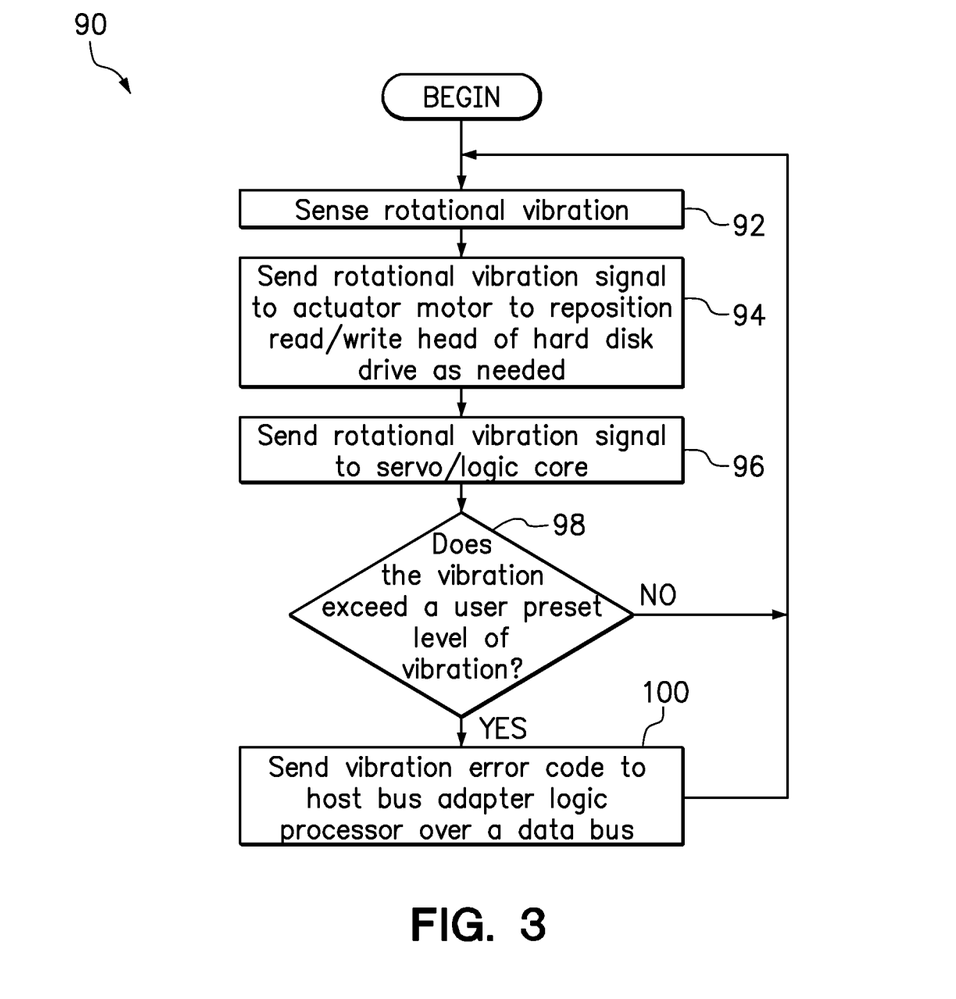
FIG. 3 is a flowchart of a method of a hard disk drive sensing rotational vibration and sending a vibration error code to a host bus adapter logic processor.
Figure 4:
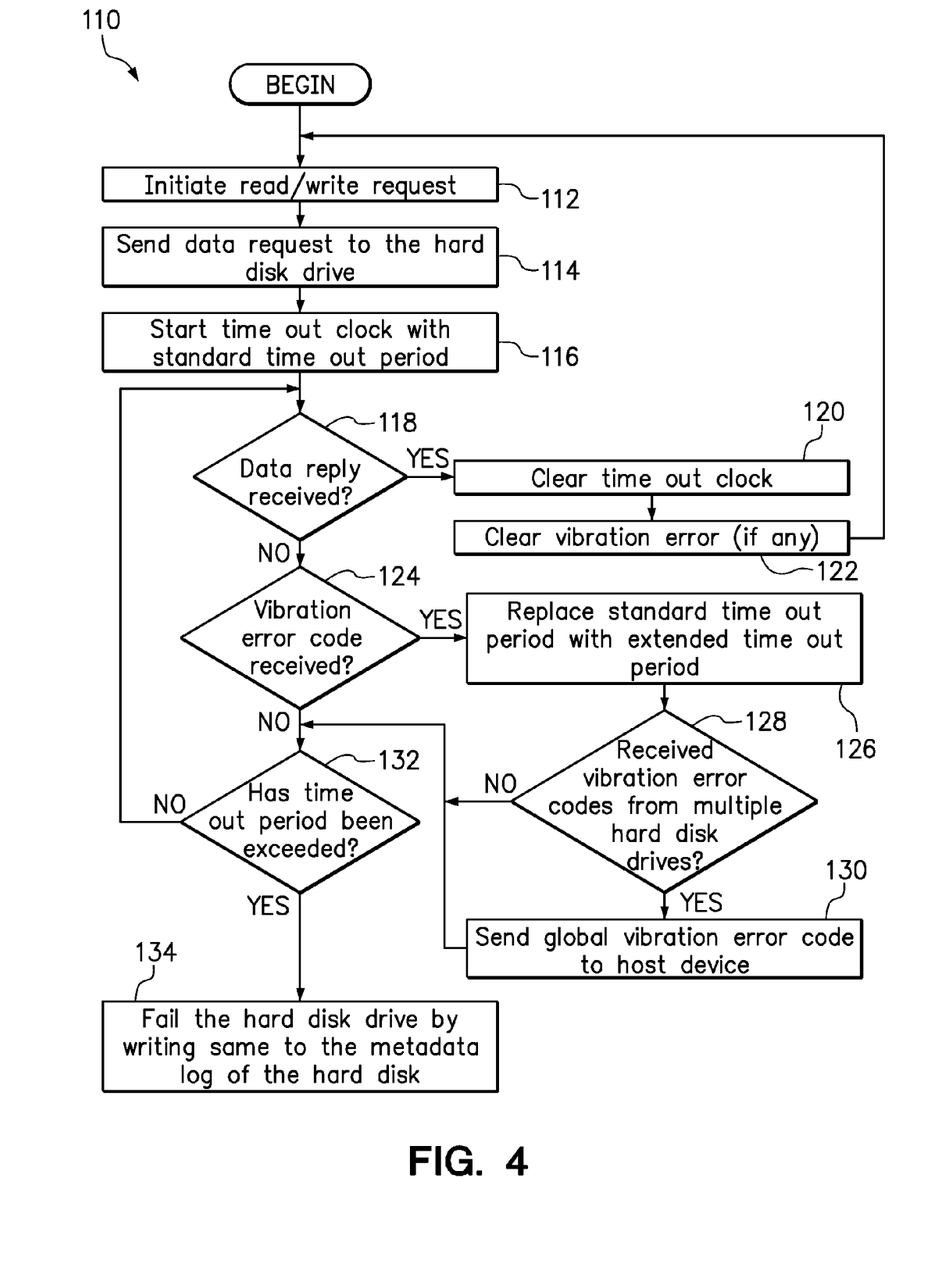
FIG. 4 is a flowchart of a method of a host bus adapter logic processor sending a data request to a hard disk drive and receiving a reply or vibration error code from the hard disk drive.

FIGS. 2-4, below, are flowcharts of methods performed by the hard disk drive (HDD) 20 and the host bus adapter logic processor 40. Each flowchart represents a specific, non-limiting embodiment of a method for the purpose of further describing how the invention may be implemented. These methods are more specific implementations of the invention, but they are intended to be consistent with the overall method set out in FIG. 1.

FIG. 2 is a flowchart of a method 70 of a hard disk drive (HDD) receiving and replying to a data request. If the HDD does not receive a data request in step 72, then it waits in step 74. Once a data request has been received, the HDD uses its servo/logic core to read/write data according to the data request in step 76. Then, in step 78, if the data read/write task is not completed, the HDD waits in step 80. Once the data read/write is complete, then a reply is sent with any data that was requested in step 82.

FIG. 3 is a flowchart of a method 90 of a hard disk drive (HDD) sensing rotational vibration and sending a vibration error code to a host bus adapter logic processor. In step 92, rotational vibration is sensed by a sensor within the HDD mechanism. Then, in step 94, a rotation vibration signal is sent to the HDD actuator motor to reposition a read/write head of the HDD as needed to properly perform a desired read/write operation. The rotational vibration signal is also sent to the servo/logic core of the HDD in step 96. If the vibration does not exceed a user preset level of vibration, as determined in step 98, then the process returns to step 92. However, if step 98 determines that the vibration exceeds the user preset level of vibration, then step 100 sends a vibration error code to the host bus adapter logic processor over a data bus.

FIG. 4 is a flowchart of a method 110 of a host bus adapter logic processor sending a data request to a hard disk drive (HDD) and receiving a reply or vibration error code from the HDD. The host bus adapter logic processor initiates a read/write request in step 112, sends the data request to the HDD in step 114, and starts a time out clock with a standard time out period in step 116. If the host bus adapter logic processor receives a data reply, as determined in step 118, then the time out clock is cleared in step 120 and any vibration error that was received from the relevant HDD is cleared in step 122.

However, if step 118 determines that the host bus adapter logic processor has not yet received a data reply, then step 124 determines whether a vibration error code has been received from the HDD to which the data request was sent. If such a vibration error code was received, then step 126 replaced the standard time out period with an extended time out period. If the host bus adapter logic processor has received vibration error codes from multiple HDDs, as determined in step 128, then a global vibration error code is sent to the host device in step 130. Following step 128 and/or step 130, or if a vibration error code was not received in step 124, then the process proceeds to step 132. In step 132, if it is determined that the time out period that is in force (either the standard time out period or the extended time out period) has not been exceeded, then the process returns to step 118. However, if the time out period that is in force has been exceeded, then the hard disk is tagged as having failed, in step 134, by writing a failure code to the metadata log of the HDD.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described in this application with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:

sending a data request from a host bus adapter logic processor to a hard disk drive;

setting a standard time out period for receiving a reply from the hard disk drive;

sensing vibration in the hard disk drive;

sending a vibration alert signal from the hard disk drive to the host bus adapter logic processor in response to the sensed vibration exceeding a predetermined amount of vibration;

in response to receiving the vibration alert signal from the hard disk drive, the host bus adapter logic processor establishing an extended time out period for receiving the reply, wherein the host bus adapter logic processor receives the vibration alert signal and establishes the extended time out period prior to expiration of the standard time out period; and writing meta data to the hard disk drive in response to exceeding either the standard time out period without receiving a vibration alert signal or the extended time out period after receiving a vibration alert signal, wherein the meta data indicates that the hard disk drive has failed and prevents the host bus adapter logic processor from using the failed hard disk drive.

2. The method of claim 1, further comprising:

the host bus adapter logic processor reporting a vibration event alert signal to a host device in response to receiving a vibration alert signal from a plurality of hard disk drives.

3. The method of claim 2, further comprising:

the host device taking evasive action to protect data on the plurality of hard disk drives in response to receiving the vibration event alert signal.

4. The method of claim 3, wherein the evasive action to protect data on the plurality of hard disk drives is selected from stopping data flow with the hard disk drives, performing a fire hose dump, initiating a remote backup of the data on the hard disk drives, and issuing a user-detectable alert.

5. The method of claim 1, wherein the hard disk drive is a component of a redundant array of independent disks.

6. The method of claim 1, further comprising:

the host bus adapter logic processor performing additional error recovery during the extended time out period.

7. The method of claim 1, wherein the vibration in the hard disk drive is sensed by a rotational vibration sensor that provides a signal used to reposition the read/write head of the hard disk drive.

8. The method of claim 1, wherein the host bus adapter logic processor is included in a device selected from a host bus adapter and a hard disk drive controller.

9. A computer program product including computer usable program code embodied on a non-transitory computer usable storage medium, the computer program product comprising:

computer usable program code for sending a data request from a host bus adapter logic processor to a hard disk drive and setting a standard time out period for receiving a reply from the hard disk drive;

computer usable program code for sending a vibration alert signal from the hard disk drive to the host bus adapter logic processor in response to sensing hard disk drive vibration exceeding a predetermined amount of vibration;

computer usable program code for the host bus adapter logic processor, in response to receiving the vibration alert signal from the hard disk drive, establishing an extended time out period for receiving the reply, wherein the host bus adapter logic processor receives the vibration alert signal and establishes the extended time out period prior to expiration of the standard time out period; and computer usable program code for writing meta data to the hard disk drive in response to exceeding either the standard time out period without receiving a vibration alert signal or the extended time out period after receiving a vibration alert signal, wherein the meta data indicates that the hard disk drive has failed and prevents the host bus adapter logic processor from using the failed hard disk drive.

10. The computer program product of claim 9, further comprising:

computer usable program code for the host bus adapter logic processor reporting a vibration event alert signal to a host device in response to receiving a vibration alert signal from a plurality of hard disk drives.

11. The computer program product of claim 10, further comprising:

computer usable program code for the host device taking evasive action to protect data on the plurality of hard disk drives in response to receiving the vibration event alert signal.

12. The computer program product of claim 11, wherein the evasive action to protect data on the plurality of hard disk drives is selected from stopping data flow with the hard disk drives, performing a fire hose dump, initiating a remote backup of the data on the hard disk drives, and issuing a user-detectable alert.

13. The computer program product of claim 9, wherein the hard disk drive is a component of a redundant array of independent disks.

14. The computer program product of claim 9, further comprising:

computer usable program code for the host bus adapter logic processor performing error recovery during the extended time out period.

15. The computer program product of claim 9, wherein the vibration in the hard disk drive is sensed by a rotational vibration sensor that provides a signal used to reposition the read/write head of the hard disk drive.

16. The computer program product of claim 9, wherein the host bus adapter logic processor is included in a device selected from a host bus adapter and a hard disk drive controller.

* * * * *